Figure 1:
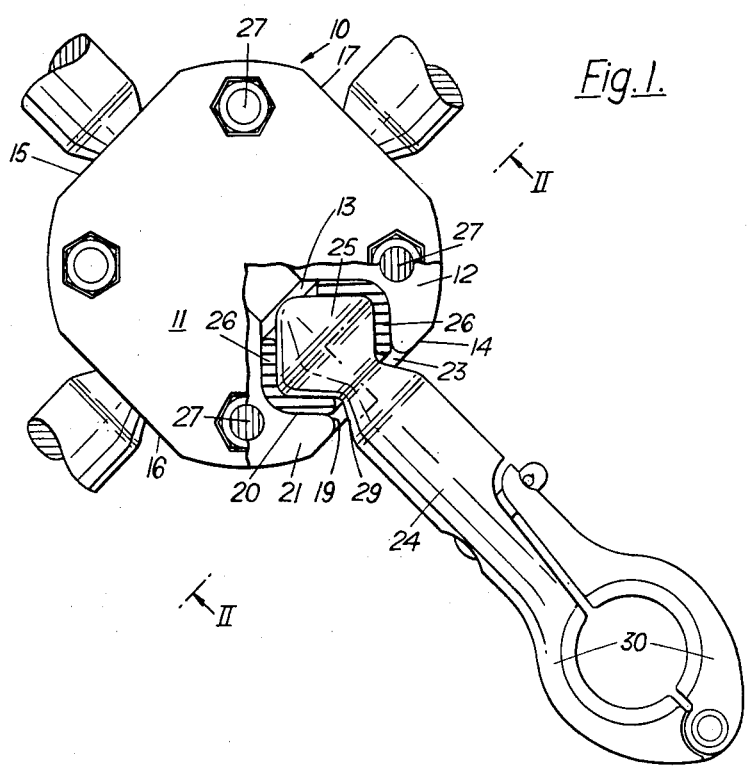

Nov. 17, 1964   R. P. TORR   3,157,731
CABLE SPACERS FOR MULTI-CONDUCTOR ELECTRICAL
OVERHEAD TRANSMISSION LINES
Filed Dec. 4, 1962

Inventor
RALPH PERCIVAL TORR

By Linton and Linton
Attorneys 3,157,731
CABLE SPACERS FOR MULTI-CONDUCTOR ELECTRICAL OVERHEAD TRANSMISSION LINES
Ralph Percival Torr, New Malden, England, assignor to Andre Rubber Company Limited, Tolworth, Surrey, England, a British company
Filed Dec. 4, 1962, Ser. No. 242,130
Claims priority, application Great Britain, Dec. 5, 1961, 43,477/61
4 Claims. (Cl. 174—40)

This invention relates to spacing devices for spacing individual conductors of one phase or pole of an overhead electrical transmission line of the general type comprising a plurality of lamps, each adapted to embrace one of the conductors, connected together by a framework. The object of the invention is to provide such a spacing device by which relative movement of the several clamps is permitted under resilient constraint in a direction parallel with the axes of the clamps (that is in the longitudinal direction of the transmission line), in directions perpendicular to the several axes of the clamps both generally circumferentially about the center of the symmetry of the conductors of the transmission line and generally radially with respect to that center and by which is permitted limited rotation of each clamp about an axis passing through that clamp and through or near the center of symmetry. In short the object of the invention is to provide a spacing device that permits under resilient constraint all those relative movements of the individual clamps that are required to accommodate the relative longitudinal and lateral movements or displacements of the several conductors of an electrical transmission line that are liable to occur in practice due to changes of conditions during service and due to retensioning the individual conductors when such is needed.

According to the invention, a transmission line spacer comprises a central rigid hub having therein a plurality of cavities each having an opening in the periphery of the hub, a corresponding plurality of rigid arms each extending near one end freely and with clearance through one of the openings and having at that one end a knob similar in shape to but smaller in dimensions than the cavity in which it is housed, and elastomeric material at least partially embracing each knob within each cavity and subject to precompression between the knob and the bounding wall of the cavity or bonded to one or both of the knob and cavity wall or both under precompression and so bonded.

The cavities and peripheral openings of the hub are symmetrically disposed about the axis of symmetry of a generally circular or polygonal hub, which latter may comprise two discs, assembled face to face and having respectively recesses in their juxtaposed faces, each forming one half of a cavity, and having radial grooves extending from the recesses to the periphery and each constituting one half of an opening. The two discs may be secured together by means of bolts or rivets. The recesses have a plurality of straight sides or may be polygonal at least in cross-section in the plane perpendicular to the axis of the hub, and they may have straight sides or be polygonal in cross section in planes perpendicular to the radii of the hub. The knobs of the arms may be geometrically similar in shape to the cavities of the hub but smaller in all dimensions. Each arm may have, adjacent the knob, a neck of reduced diameter so as to provide adequate clearance in the opening to permit substantial angular movement of the arm about two mutually perpendicular axes each perpendicular to the length of the arm. The spaces between the knobs and the cavity walls are wholly or partially filled with elastomeric material, such as natural or synthetic rubber, which is preferably under precompression and which is preferably also bonded to one or to both of the knobs and the cavity walls. However, when the cavities and knobs are polygonal in both the cross-sections previously referred to, bonding is not essential. The elastomeric material may embrace the knobs and fill the cavities substantially completely; but, the elastomeric material may be localised, in the form of pads, for example.

Figure 2:
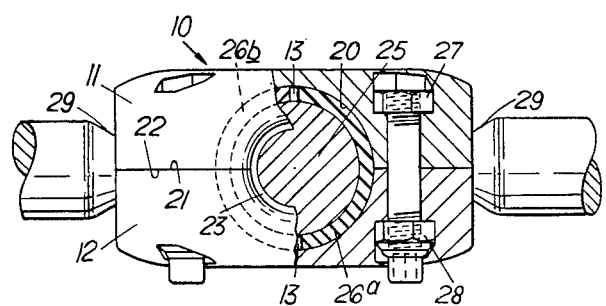

For the better appreciation of the invention, one particular embodiment of it will now be described with reference to the accompanying drawing in which:

FIG. 1 is an elevation of the hub and one complete arm of a spacing device, the remaining arms being shown broken away; and FIG. 2 is a part elevation and part section taken on the line II—II of FIG. 1.

Referring now to the drawing, the spacing device comprises a hub 10 provided by two discs 11 and 12 face to face with one another, each of generally straight sides or polygonal shape, in the case shown substantially octagonal and having mutually orthogonal pairs of opposite sides 14, 15 and 16, 17. The hub 10 has four cavities such as 13 that are symmetrically disposed about the axis of symmetry of the hub. Each of the cavities such as 13 has an opening such as 19 in the periphery of the hub 10. In the case shown these openings are respectively in the centers of the sides 14, 15 and 16, 17. The cavities such as 13 are provided by recesses such as 20 formed respectively in the juxtaposed faces 21 and 22 of the discs 11 and 12. Likewise, the openings 19 are provided by radial grooves 23 extending from the recesses 20 to the peripheries of the discs 11 and 12. The recesses 13 are, as indicated in the drawing, straight sided or polygonal in cross-section in a plane perpendicular to the axis of the hub 10. The recesses 13 are, in the case shown, of circular cross-section in planes perpendicular to radii of the hub extending outwardly from the axis of the hub 10. However, the recesses may, if desired be polygonal in the latter cross-sections.

The spacing device further comprises a plurality of rigid arms such as 24, of metal, for example, one end of each of which extends freely and with clearance through one of the openings 19. Each such arm 24 has at that end a knob 25 that is similar in external shape to but smaller in dimensions than the cavity 13.

Each of the arms 24 has, adjacent its knob 25, a neck 29 of reduced diameter such as to provide adequate clearance in the opening 19 to permit substantial angular movement of the arm 24 about two mutually perpendicular axes perpendicular to the length of the arm and located at or near the center of the knob 25. Each arm 24 may be provided at its free end with a clamp 30 of conventional pattern for securing to it a conductor of a transmission line. Clamps 30 of the kind described in our copending application Serial No. 240,119 are, however, preferred.

Elastomeric material 26, such as natural or synthetic rubber, at least partially embraces each knob 25 within each cavity 13. This elastomeric material may be in the form of a continuous shell embracing the knobs 25. However, it is conveniently shown in the drawing in the form of two pads 26a and 26b each embracing slightly less than one half of the periphery of the knob 25. In any case, the elastomeric material 26 is placed under substantial precompression. In the structure shown in the drawing the two discs 11 and 12 are secured together by means of bolts 27 and nuts 28. The necessary precompression of the elastomeric material is secured by wrapping around the knobs 25 or assembling in the recesses 20 somewhat more than sufficient thickness of elastomeric material to fill the annular spaces between the knobs 25 and the bounding walls of the recesses 20, assembling the discs 11 and 12 with the knobs 25 registering with their respective recesses 20, inserting the bolts 27, and applying and tightening the nuts 28. The elastomeric material 26 is cemented or bonded to the interior surfaces of the recesses 20 or to the exterior surface of the knobs 25, or to both. Such bonding may be effected by means of a suitable bonding agent applied during assembly and assisted by an accelerator or by heat. This bonding may be completed before or after the final tightening of the nuts 28 on the bolts 27 to place the elastomeric material in compression.

It will be appreciated that the resilient joints between the arms 24 and the hub 10 according to this invention serve as resiliently constrained universal joints permitting angular movement of each arm 24 relative to the hub 10 about three mutually perpendicular axes, owing to the resilient straining of the elastomeric material 26 almost wholly in shear. Furthermore limited translational movement of each arm 24 relatively to the hub 10 under resilient constraint in directions both parallel with and perpendicular to the axis of the hub 10 is permitted by the compressive elasticity of the elastomeric material 26. Moreover slight rotational movement about its own axis is permitted to each arm 24 under resilient constraint. Thus the various relative displacements to which the conductors of a transmission line are subject are all resiliently accommodated.

What I claim is:

1. A spacing device for spacing the individual conductors of an overhead electrical transmission line, said device comprising a central rigid hub that is generally symmetrical about a central axis and having therein a plurality of cavities, each said cavity having an opening in the periphery of said hub, each said cavity having a plurality of diverging straight sides at least in the cross-sections perpendicular to the axis of symmetry of said hub; a corresponding plurality of rigid arms each extending at one of its ends through one of the said hub openings and having at that one end a knob similar in shape to but smaller in overall dimensions than the cavity and its opening in which it is housed; and elastomeric material at least partially embracing each knob and maintained under compression within each cavity.

2. A spacing device according to claim 1 for individual conductors of an overhead electrical transmission line wherein said elastomeric material is bonded to at least one of said knobs and said hub.

3. A spacing device for spacing the individual conductors of an overhead transmission line, said device comprising a central rigid hub that is generally symmetrical about a central axis and having therein a plurality of cavities symmetrically disposed about the axis of said hub, each said cavity having an opening in the periphery of said hub, each said cavity being polygonal at least in the cross-sections perpendicular to the axis of symmetry of said hub; a corresponding plurality of rigid arms each extending generally radially relatively to said axis through a respective one of said hub openings and having a knob of the same shape as but smaller in overall dimensions than one of said cavities and its opening each knob being housed within one of said cavities and its opening; and elastomeric material at least partially embracing each knob and maintained under compression within the respective cavity.

4. A spacing device according to claim 3 for individual conductors of an overhead electrical transmission line wherein said elastomeric material is bonded to at least one of said knobs and the wall of its cavity.

References Cited in the file of this patent

UNITED STATES PATENTS

| | | |
|---|---|---|
| 281,311 | Snell | July 17, 1883 |
| 1,943,912 | Bollinger | Jan. 16, 1934 |
| 2,176,519 | Anderson | Oct. 17, 1939 |
| 2,195,336 | Loop | Mar. 26, 1940 |
| 3,030,132 | Compton | Apr. 17, 1962 |

FOREIGN PATENTS

| | | |
|---|---|---|
| 171,630 | Austria | June 25, 1952 |
| 410,825 | Great Britain | May 25, 1934 |
| 788,076 | Great Britain | Dec. 23, 1957 |